UNITED STATES PATENT OFFICE.

WILLIAM J. A. BAILEY, OF BOSTON, MASSACHUSETTS, ASSIGNOR, BY MESNE ASSIGNMENTS, TO NON SKID COMPANY OF AMERICA, OF BOSTON, MASSACHUSETTS, A CORPORATION OF MASSACHUSETTS.

PROCESS OF CUTTING WIRE ROPE.

1,261,892. Specification of Letters Patent. Patented Apr. 9, 1918.

No Drawing. Application filed June 20, 1917. Serial No. 175,950.

*To all whom it may concern:*

Be it known that I, WILLIAM J. A. BAILEY, of Boston, in the county of Suffolk and State of Massachusetts, a citizen of the United States, have invented a new and useful Improvement in the Processes of Cutting Wire Rope, of which the following is a full, clear, and exact description.

The present invention relates to a new process for cutting or severing wire rope.

Wire rope consists of a multiplicity of elastic wires twisted together. Owing to the twisted formation of the rope and the elasticity of its wires, if the rope be cut either by heat or other means and no care be exercised, a frayed end will result and the rope will unstrand for a considerable distance, making it valueless to the extent of its unwinding.

Under these circumstances the usual method heretofore practised for severing wire rope has been to bind the rope on either side of the place to be cut with a fine wire and then to cut the rope with a tool between the bindings, which are left upon the respective ends after the cutting. This method is objectionable inasmuch as it requires considerable time to properly bind the rope and after the cutting the wires left, increasing as they do the diameter of the rope, are most objectionable, and there is always danger of their giving way allowing the rope to unstrand.

Another method consists in the formation of a collar upon that part of the rope to be cut by means of a brazing metal and heat. After the formation of the collar or ring of brazed metal around the rope the metal is cut through and the rope thus separated. This method is slow, costly, and requires the grinding or finishing of the brazed ends left, on account of the metal left by the brazing, which increases the diameter of the rope and is otherwise unsightly and objectionable.

The essential object of my invention is to provide a method of cutting the rope, both quick and economical, and without the necessity of binding the rope or brazing a collar thereon, or doing such things else to prevent unstranding as take time, involve expense, increase the diameter of the rope and leave an unfinished end.

The method is as follows:—

The rope is first heated at and adjacent the point or place where the cut is to be made. In practice the rope is heated for about half an inch to either side of this point. In other words, the heated area is preferably confined to that portion of the rope which would lie within a circle whose radius is about half an inch. This initial heating is effected by any suitable application of heat as will cause the strands of the wire to adhere to one another sufficiently to prevent unstranding during the localized application of heat for effecting the actual cutting as will later be noted. The heating may be done by any high temperature flame such as the oxy-acetylene flame, oxy-hydrogen flame, oxygen gas flame or by an electric arc.

In order to obtain a proper primary adhesion between strands of wire the application of heat is continued until the metal is brought to a white heat and begins to fuse or melt slightly. Not only does this cause adhesion between the strands, but it acts also to decarbonize or draw the temper from the wires along the part heated which assists in preventing unstranding during the subsequent cutting.

After the primary welding together or uniting of the strands of the rope the process is continued either immediately or at some future time by the localization of the heat or flame (sufficient to melt or otherwise cut through the rope) at the exact point where the cut is to be made, the application of heat being continued until the rope is cut through. This secondary operation not only acts to sever the rope, but acts, also, to melt the ends of the strands or rope adjacent the point of severance and the metal thus melted will run together and form a homogeneous whole, which binds together the ends of all the strands and wires, thereby forming a permanent end which cannot easily be disrupted and also a practically finished end, requiring little or no smoothing or grinding, and one which does not increase the diameter of the rope.

It will be understood that the primary heating makes no stable adhesion between the strands of wire but only such adhesion or uniting as will prevent unstranding during the severance of the rope or actual cutting operation. The initial welding is of course more or less superficial and confined more particularly to the outer strands, yet there is probably some slight welding together of all the strands within the heated area. At any rate the strands hold together sufficiently to make the cut without unstranding. The localized application of heat for severing or cutting the rope can immediately follow the primary heating by reason of the rapidity of heat radiation which allows of a sufficient cooling of the rope on either side of the cutting point as will secure adhesion when the heat is localized. The heat will radiate along the rope from the cutting point during the cutting operation, but this will be insufficient to disturb the adhesion between the strands or wires on either side of such point which has been obtained.

When the oxy-acetylene flange is employed the process is best accomplished by the primary use of its outer or so-called welding flange and afterward the actual cutting operation effected by the inner portion of the flame, that comprising its oxygen tip which is a much hotter flame.

Having thus fully described my invention, I claim and desire to secure by Letters Patent of the United States:—

1. The process of cutting wire rope which comprises a preliminary uniting of the strands of the rope by the application of heat to the rope and the cutting of the rope by localization of heat within the area of the bound strands.

2. The process of cutting wire rope which comprises a preliminary heating of the rope by such means and in an amount sufficient to unite the strands of the rope and prevent unstranding during the subsequent cutting operation, and cutting the rope by a localized application of heat within the area of the bound strands previously heated.

3. The process of cutting wire rope which comprises uniting the strands of the rope at and adjacent the point where the cut is to be made by application of heat thereto and afterward localizing heat within the area of the bound strands by such means and in such manner as to cut through the rope and fuse together the loose ends of the wires at the respective cut ends.

4. The process of cutting wire rope which comprises applying heat to the rope at and adjacent the point thereon at which the cut is to be made by a flame sufficient to unite the strands of the wire and prevent unstranding during the subsequent cutting operation and afterward localizing heat in the area of the bound strands by applying thereto a flame sufficient to cut through the rope and fuse together the loose ends of the wires at the respective ends of the rope left by the cutting.

WILIAM J. A. BAILEY.

Copies of this patent may be obtained for five cents each, by addressing the "Commissioner of Patents, Washington, D. C."